United States Patent [19]

Simone et al.

[11] 4,200,239
[45] Apr. 29, 1980

[54] MACHINE THAT QUADRATES DOCUMENTS

[75] Inventors: James V. Simone; Kalin I. Sheppard, both of High Point, N.C.

[73] Assignee: Wright Line Inc., Worcester, Mass.

[21] Appl. No.: 924,510

[22] Filed: Jul. 14, 1978

[51] Int. Cl.² ............... B02C 18/16; B02C 25/00
[52] U.S. Cl. ............... 241/36; 241/222; 241/243
[58] Field of Search ............ 83/349, 356.3, 856, 83/906; 241/243, 236, 222, 190, 152 A, 101.7, 36

[56] References Cited

U.S. PATENT DOCUMENTS

| | | | |
|---|---|---|---|
| 1,996,177 | 4/1935 | Stevenson | 241/152 A X |
| 3,186,651 | 6/1965 | Briolini | 241/243 X |
| 3,189,286 | 6/1965 | O'Connor | 241/101.7 X |
| 3,217,988 | 11/1965 | Lightfoot et al. | 241/243 X |
| 3,545,689 | 12/1970 | Luscombe | 241/243 X |
| 3,620,461 | 11/1971 | Pelleschi et al. | 241/152 A X |
| 3,860,180 | 1/1975 | Goldhammer | 241/236 X |
| 3,894,697 | 7/1975 | Lawson et al. | 241/236 X |
| 3,921,920 | 11/1975 | Brocard | 241/236 X |
| 3,960,335 | 6/1976 | Haberle | 241/236 |

FOREIGN PATENT DOCUMENTS 1342354  1/1974  United Kingdom ............ 241/243

*Primary Examiner*—Mark Rosenbaum
*Attorney, Agent, or Firm*—Milton E. Gilbert

[57] ABSTRACT

A machine that quadrates documents comprising a stationary plate having along one edge a plurality of transversely-spaced cutting edges defining a cutting area, a rotor having axially thereof and radially-spaced from its axis a plurality of complementary cutting edges supported for rotation with the rotor about an axis parallel to the edge of the stationary plate for movement of the cutting edges in shearing relation to the cutting edges on the stationary plate and sheet-feeding rolls for advancing the documents to be quadrated along the surface of the stationary plate onto the cutting area to present a portion thereof to the cutting edges in timed relation to movement of the cutting edges into cutting relation with each other.

4 Claims, 9 Drawing Figures

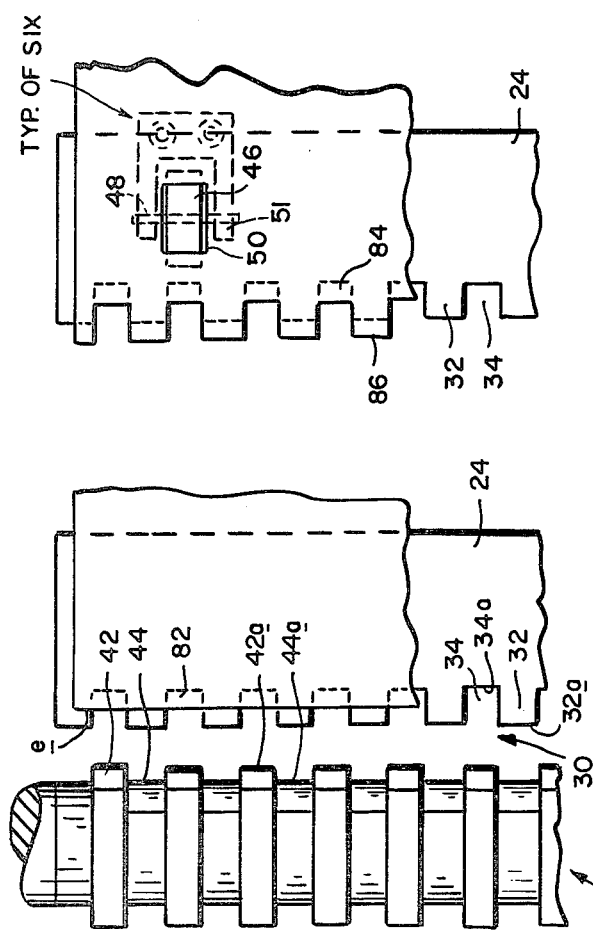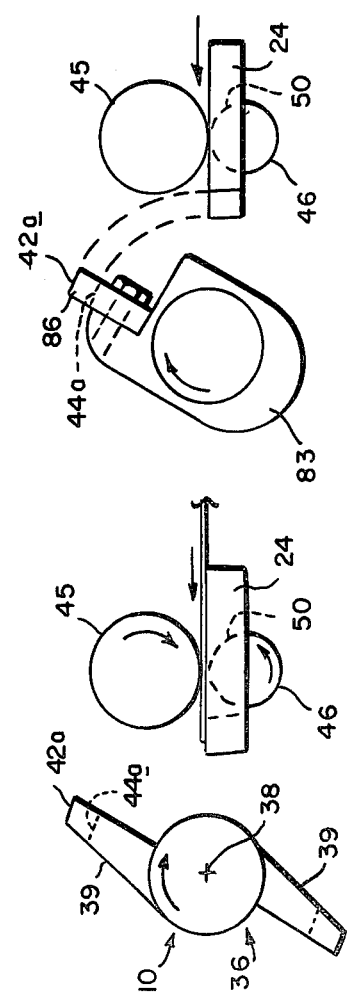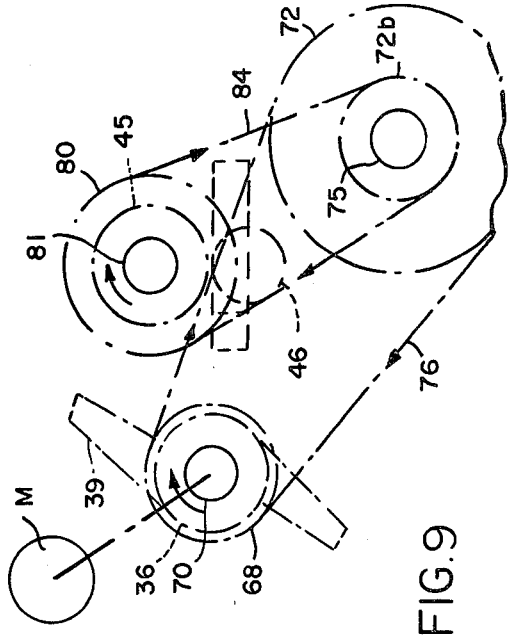

MACHINE THAT QUADRATES DOCUMENTS

BACKGROUND OF INVENTION

The conventional paper shredder is intended to make confidential documents which are to be destroyed unreadable by tearing them into many narrow strips. For anyone determined to reconstruct the documents thus shredded to find out the information contained therein, piecing together these strips, although time-consuming, is not overly difficult because the strips fall into the waste receptacle in roughly the same sequence and proximity as they were before being torn. Thus, conventional shredders, while useful for certain purposes, are not a foolproof way of rendering documents illegible. Such conventional shredders are shown by way of example in U.S. Pat. Nos. 3,960,335; 3,894,697; 3,860,180; 3,620,461; 3,217,988 and 1,996,177.

All of the aforesaid patents deal with rendering documents illegible by shredding them into narrow strips which, as related above, is insufficient to render the documents completely illegible. The purpose of this invention is to provide a machine to quadrate documents which does not cut the paper into narrow strips, but, instead, reduces the documents to small squares or rectangles that then will fall randomly into the waste receptacle and, hence, will be very difficult to reassemble for the purpose of reading the original document. The machine has the further advantage that the small pieces are much more likely to lie flat upon each other with less air space between adjacent surfaces, thus making it unnecessary to compact for disposal.

SUMMARY OF INVENTION

As herein illustrated, the machine to quadrate documents comprises stationary and movable parts, said stationary part having along one edge deviating cutting edges defining a cutting area and said movable part having complementary cutting edges. There is means for supporting the movable part for movement of its cutting edge in shearing engagement with the cutting edge of the stationary part, means for effecting movement of the movable part relative to the stationary part and sheet forwarding means for advancing the sheet material to be cut onto the cutting area of the stationary part at a rate to present a length thereof to said cutting area of the stationary part in timed relation to the movement of the cutting edge of the movable part into shearing engagement with the cutting edge of the stationary part. The deviating cutting edges comprise alternately arranged projections and recesses of rectangular configuration. The stationary part is a flat plate having the deviating cutting edges arranged transversely along one edge and the movable part is a rotor having the deviating edges located axially thereof and radially-spaced from the axis of rotation supported adjacent the cutting edge of the stationary part for rotation about its axis so as to move the cutting edge supported thereby in shearing relation with the cutting edge of the plate. There is means for rotating the rotor and sheet-feeding means for advancing the sheet material along the surface of the plate into the area of cutting at a rate such as to present a length thereof corresponding to the cutting area in timed relation to the movement of the cutting edges into shearing engagement with each other. The sheet-feeding means comprise transversely-spaced rollers above and below the stationary plate, the surfaces of which meet substantially in the plane of the upper surface of the stationary plate and, for this purpose, the stationary plate is provided with openings through which the feed rolls at the lower side project to the level of the upper surface of the plate. The feed rolls at the upper side are driven and those at the lower side are idle. There is also guide means comprising a plate arranged in converging relation to the upper surface of the stationary plate for receiving and guiding the leading end of the sheet material to be cut into the bite between the feed rolls for delivery to the cutting edges.

The invention will now be described in greater detail with reference to the accompanying drawings, wherein:

FIG. 3 is an enlarged fragmentary plan view showing the relation of the shearing elements to each other and showing the position of the leading edge of the sheet of paper in the area of shearing;

FIG. 4 is an elevation taken on the line 4—4 of FIG. 3;

FIG. 5 shows the initial cut at the leading end of the sheet material being cut;

FIG. 6 shows the areas of the succeeding cuts;

FIG. 7 shows the final cut;

FIG. 8 shows the elevation of an alternative form of rotary cutter; and

FIG. 9 is an elevation showing the drive means from the drive motor to the rotor and the driven feed roll.

Figure 1:
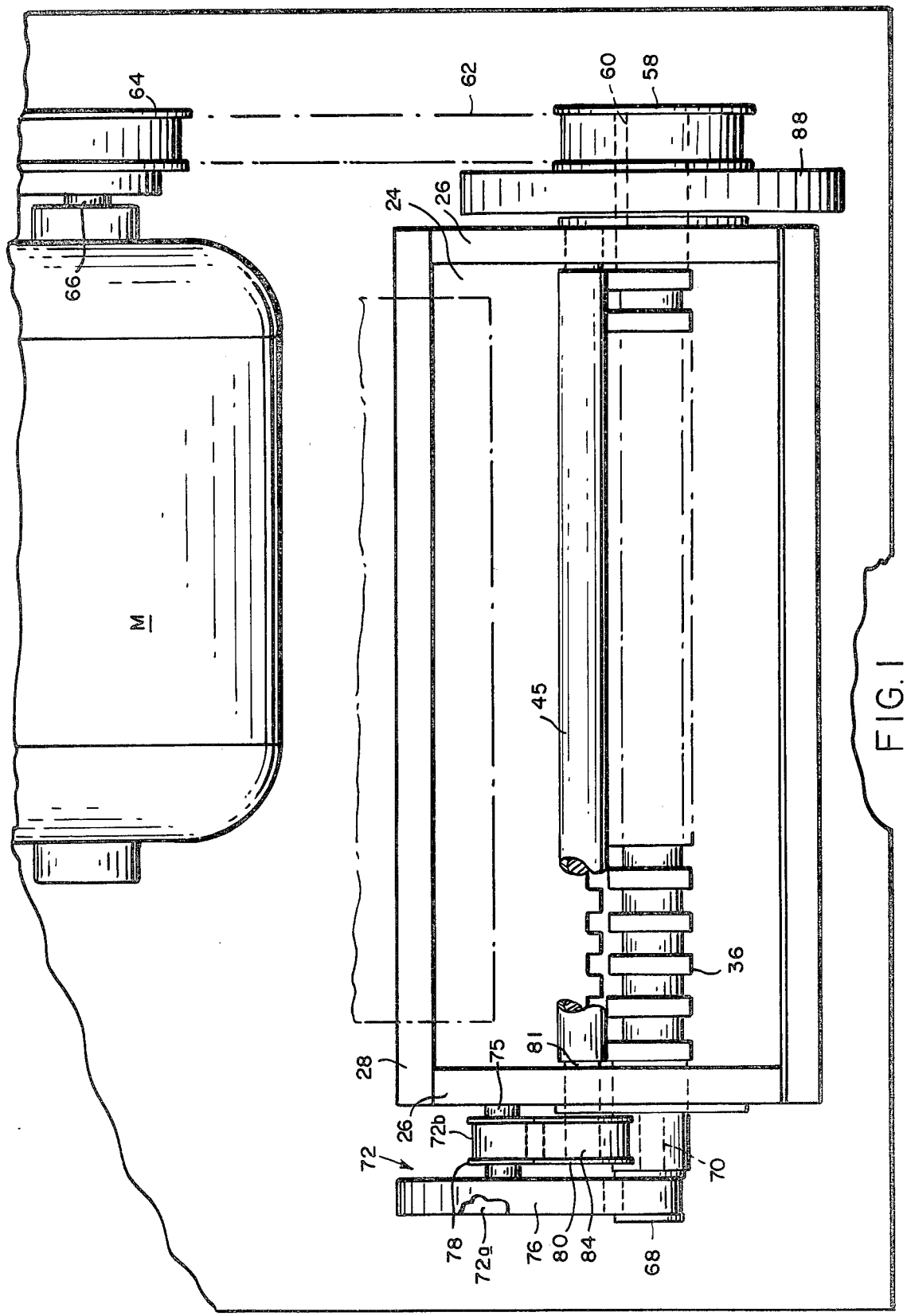
FIG. 1 is a plan view of the machine for quadrating documents of this invention with parts broken away.
Figure 2:
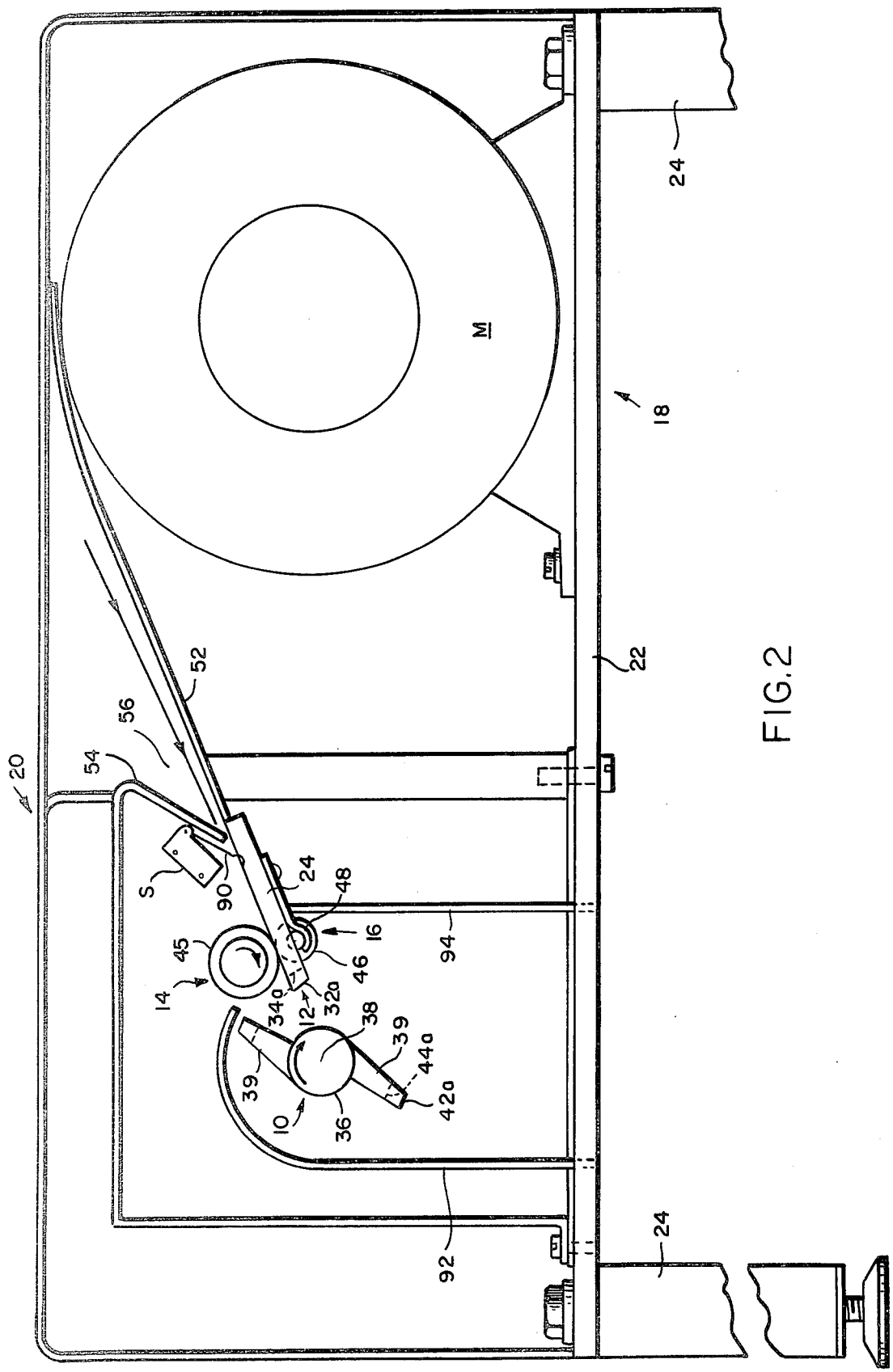
FIG. 2 is a vertical section taken on the line 2—2 of FIG. 1.

Referring to FIGS. 1 and 2, the machine to quadrate documents comprises cutting instrumentalities 10 and 12, sheet-feeding means 14 and 16, and a motor M for driving both the cutting instrumentalities and the sheet-feeding means mounted on a suitable supporting structure 18 within an enclosure 20.

The supporting structure 18 comprises a flat, rigid plate 22 bolted at its four corners to the upper ends of legs 24, the lower ends of which are provided with adjustable pads 26 by means of which the structure may be leveled. The enclosure 20 is comprised of suitable sheet material which may be metal or plastic and is substantially rectangular in horizontal and vertical section and of such dimension as to cover not only the cutting and feeding instrumentalities, but also the drive motor M and the driving connections between the motor, cutting instrumentalities and sheet-feeding means.

The cutting instrumentality 12 is a flat, downwardly-inclined rigid plate 24 supported at its opposite ends between transversely-spaced, vertically-disposed uprights 26—26 joined transversely of the machine by a vertically-disposed upright 28. The rigid plate 24 has at its lower end a transversely-arranged cutting edge 30 which, as shown in FIGS. 3 to 7, comprises a plurality of transversely-spaced and alternately-arranged protrusions 32 and recesses 34 which define a narrow, transverse, crenulated cutting area, the length of which corresponds to the transverse width of the plate and the width of which corresponds to the longitudinal distance between the end of a protrusion and the bottom of a recess. The ends, sides and bottoms of the crenulations all constitute cutting edges and are so dimensioned as to enable cutting the sheet material into pieces of no larger area than are defined by the depth and width of the recesses.

The cutting instrumentality 10 comprises a rotor 36 supported at its ends for rotation in the uprights 26—26 on the supporting frame for rotation about an axis 38 parallel to the cutting edge of the plate 24. The rotor 36 has diametrically-disposed arms 39—39, at the distal ends of which there are cutting edges 40—40, each comprising a plurality of axially-disposed and alternately-spaced protrusions and recesses 42 and 44 which are complementary to the protrusions and recesses 32 and 34 of the stationary plate 24 and which are supported by the rotor so that they mesh in shearing relation with the protrusions and recesses 32,34 as the rotor is rotated relative to the stationary plate 24. The dimensions of the protrusions at the ends of the arms on the rotor are such that the extremities of the protrusions clear the bottoms of the recesses so as to enable movement of the protrusions through the recesses of the stationary plate in cutting relation, but without binding.

As thus constructed, the stationary cutting instrumentality comprising the plate 24 has cutting edges 32a, 34a and the cutting instrumentality comprising the rotor 36 has cutting edges 42a,44a.

The sheet-feeding means 14 and 16 for moving the sheet material into position for shearing comprises above the plate 24 a rubber-covered roll 45 supported at its ends in the uprights 26—26 for rotation about an axis parallel to the upper surface of the plate 24 with its peripheral surface substantially in tangential relation to the plane of the upper surface of the plate 24 and at the lower side of the plate transversely-spaced idler rolls 46 mounted on shafts 48 within transversely-spaced slots, FIG. 5, formed in the plate through which the upper portions of these rollers project into tangential relation to the upper surface of the plate. The idler rolls 46 are yieldably biased toward the rubber-covered drive roll 45 by spring fingers 51.

In order to guide the documents to be cut to the feed rolls, there is provided a downwardly-inclined floor plate 52 and above the floor plate a downwardly-inclined roof plate 54 which converges with the floor plate and provides, in conjunction therewith, a transversely-tapering throat 56 for receiving the document and guiding it onto the plate 24. There is an opening in the enclosure 20 above the floor plate for admitting documents to the throat 56.

Rotation of the rotor 36, FIGS. 1 and 9, is provided for by a pulley 58 fixed to a stub shaft 60 at one end of the rotor 36 about which is entrained one end of a belt 62, the other end of which is entrained about a pulley 64 fixed to the shaft 66 of the motor M. The sheet-feeding roll 45 is driven by a train comprising a pulley 68 fixed to a stub shaft 70 at the other end of the rotor, a two-step pulley 72 having steps 72,72b rotating on stub shaft 75, a belt 76 entrained at one end about the pulley 68 and at its other end about the step 72, a pulley 80 fixed to a stub shaft 81 at one end of the feed roll, and a belt 84 entrained at one end about the step 72b and at its other end about the pulley 80.

In operation, the material as it is fed to the machine to quadrate documents is guided inwardly and downwardly onto the stationary plate 24 by the converging guide members 52 and 54 which define the throat 56 and as the leading edge enters the bite between the rubber-covered drive roll 45 and the idler rolls 46, the leading edge is gripped and advanced onto the cutting area at the forward edge of the plate 24. As the leading edge of the sheet material moves into the cutting area, rectangular pieces 82 will be cut from the leading edge, the area of which will depend upon how much of the leading edge overlaps the cutting area at the first cutting engagement of the cutting edges. For example, if at the time the rotary cutter cuttingly engages the fixed cutter, the leading edge of the sheet material has not moved all the way out to the ends of the protrusions 32 of the stationary cutter, the pieces 82 will be of smaller area than the dimensions of the recesses.

Assuming that the pulley ratios are such that the paper is advanced ¼ inch per one half revolution of the rotating cutter 36, FIG. 3, and assuming that the cutter teeth are ¼ inch wide and ¼ inch long, and the leading edge e of the paper has been randomly inserted into a position to be cut by the approaching teeth of the rotating cutter, the edges 42a of the protrusions will mesh with the edges 34a of the recesses in the plate 24 to cut chips 82. At this point, the cutting edges 44a of the recesses 44 do not cut the paper as the paper has not advanced sufficiently. As the rotary cutter continues to move through 180°, the paper will be moved ¼ inch by the feed roll 45, FIG. 5, and when the cutting edges 42a of the protrusions 42 and the cutting edges 44a of the recesses 44 mesh with the cutting edges 32a,34a of the stationary blade 24, chips 84 and 86 will be produced by the cutting edges of the protrusions and recesses.

Subsequent meshing of the teeth of the rotating cutter 36 with the teeth of the stationary cutter 24 will now produce approximately square chips 88 and 90, FIG. 6. This action will continue until the paper is beyond the grasp of the feed roll 45. A notched scrap piece 85 will remain, FIG. 7. This scrap will either remain trapped at this position until the next sheet is inserted, at which time it will be cut in odd-shaped pieces, or it will be advanced to be cut by virtue of machine vibration.

By changing the diameters of the pulleys by means of which the rotor and the feed means are driven, the area of the pieces cut each time the cutter moves into engagement with the sheet material can be varied from an area which is less than the areas of the recesses to an area up to that of the recesses.

The rotary cutter as shown in FIGS. 1 to 4 has two diametrically-arranged cutting arms. However, a rotor with a single cutting arm may be employed as shown, for example, in FIG. 8, wherein a blade holder 83 is mounted to the rotor which has a removable blade 86 bolted thereto having along its edge protrusions and recesses corresponding to the protrusions and recesses 42 and 44 which provide cutting edges 42a,44a. The holder 83 is dynamically balanced to prevent vibration of the apparatus in operation. When using a cutter of this configuration, the speed of the rotating cutter must be doubled or the speed of the feed roll halved to produce the same size chips cut by the two-lobed cutter described above.

To provide for smooth operation, it is desirable to mount a flywheel 88 on the stub shaft 60 for rotation with the rotor.

The apparatus is automatically started by means of a starting switch S, FIG. 2, mounted in a position above the stationary plate 24 provided with an actuating finger 90 which rests on the plate 24 so that, as the document is moved downwardly beneath the finger, the latter will actuate the switch and start the motor M. As soon as the trailing end of the document allows the finger 90 to drop down, the switch will open, but a delay circuit will keep the motor running a few seconds until the sheet is cut, at which time the motor will stop.

Desirably, there are within the enclosure 20 partition walls 92,94 for containing the chips and dust generated by the cutting action of the cutters.

It should be understood that the present disclosure is for the purpose of illustration only and includes all modifications or improvements which fall within the scope of the appended claims.

We claim:

1. Apparatus for cutting sheet material into discrete chips comprising a stationary, downwardly-inclined plate having along its lower edge uniformly-spaced cutting teeth, a rotor, means mounting the rotor for rotation about an axis parallel to the lower edge of the stationary cutting plate, said rotor having axially thereof uniformly-spaced cutting teeth arranged to mesh with the cutting teeth at the lower edge of the stationary cutting plate, means for moving sheet material downwardly on the surface of the stationary plate comprising a driven rubber-covered feed roll positioned above and transversely of the plate for rotation about an axis parallel to the plate such that its surface has tangential engagement with the upper surface of the plate upstream of the lower edge and a plurality of spaced idler feed rolls positioned below the plate for rotation about axes parallel to the plate, said plate having openings through which the idler feed rolls project to substantially the level of the upper surface of the stationary plate so as to have tangential engagement with the driven feed roll, means yieldably biasing the idler feed rolls toward the driven feed roll, motor means for effecting rotation of the driven feed roll and for effecting rotation of the rotor for advancing the sheet material to the cutting edge of the stationary plate, means dynamically balancing the rotor and a fly wheel fixed to the shaft of the rotor.

2. Apparatus according to claim 1 wherein the motor means includes a circuit comprising an inclined guide supported above the stationary plate and converging downwardly toward the top thereof for guiding the sheet material into the nip of the feed rolls, switch means supported close to the surface of the stationary plate in a position to be actuated by movement of sheet material downwardly on the stationary plate to start the motor means for driving the driven feed roll and the rotor and as the sheet material moves by the switch means to open the circuit and delay means in the circuit for maintaining the motor means in operative condition for a predetermined period following deactivation of the switch means to permit the cutting operation to be completed.

3. Apparatus according to claim 1 wherein the cutting teeth on the rotor are arranged diametrically of the rotor such that the cutting teeth at one diametral side dynamically balance the cutting teeth at the other diametral side.

4. Apparatus according to claim 1 wherein the cutting teeth on the rotor are positioned at one diametral side of the rotor and a weight is positioned at the other diametral side for dynamically balancing the rotor.

* * * * *